(12) United States Patent
Boero et al.

(10) Patent No.: US 8,762,421 B2
(45) Date of Patent: Jun. 24, 2014

(54) ACCESSING ENTITIES OF DATA ACCESS LAYER

(75) Inventors: Andrea Boero, Genoa (IT); Davide Corso, Genoa (IT)

(73) Assignee: Siemens Aktiengesellschaft, Munich (DE)

(*) Notice: Subject to any disclaimer, the term of this patent is extended or adjusted under 35 U.S.C. 154(b) by 173 days.

(21) Appl. No.: 13/155,425

(22) Filed: Jun. 8, 2011

(65) Prior Publication Data

US 2011/0314062 A1    Dec. 22, 2011

(30) Foreign Application Priority Data

Jun. 17, 2010  (EP) .................................... 10166330

(51) Int. Cl.
*G06F 17/30*    (2006.01)

(52) U.S. Cl.
USPC ....................................................... 707/803

(58) Field of Classification Search
USPC ................................................ 707/792, 803
See application file for complete search history.

(56) References Cited

U.S. PATENT DOCUMENTS

| | | | |
|---|---|---|---|
| 7,526,503 B2 * | 4/2009 | Bernstein et al. | 707/999.002 |
| 7,853,961 B2 | 12/2010 | Nori et al. | |
| 7,904,487 B2 * | 3/2011 | Ghatare | 707/803 |
| 2003/0028545 A1 | 2/2003 | Wang et al. | |
| 2004/0123048 A1 | 6/2004 | Mullins et al. | |
| 2004/0181440 A1 | 9/2004 | Yeh et al. | |
| 2006/0020586 A1 * | 1/2006 | Prompt et al. | 707/3 |
| 2007/0027906 A1 | 2/2007 | Meijer et al. | |
| 2007/0226203 A1 * | 9/2007 | Adya et al. | 707/4 |
| 2010/0175044 A1 * | 7/2010 | Doddavula et al. | 717/104 |

FOREIGN PATENT DOCUMENTS

EP    1 696 352 A2    8/2006

* cited by examiner

*Primary Examiner* — Khanh Pham
(74) *Attorney, Agent, or Firm* — Laurence A. Greenberg; Werner H. Stemer; Ralph E. Locher

(57) ABSTRACT

A method and system for entities of a data access layer, the data access layer following an entity-relationship model in which data are depicted in term of entities and relationships between them and the entities are provided with a CRUD interface. The method includes the steps of: defining a meta-entity being a virtual entity, resulting as a composition of parts of one or more entities; describing the virtual entity, via a virtual entity descriptor, as a hierarchical structure in which entities are connected in a parent-child structure via a link; in the virtual entity descriptor, specifying which properties are taken from each entity to form partial entities of the virtual entity; providing a CRUD interface on the virtual entity; and at run time, accessing the virtual entity via its CRUD interface. The accessing is implemented as a set of calls to CRUD methods accessing the entities composing the virtual entity.

14 Claims, 9 Drawing Sheets

FIG 8
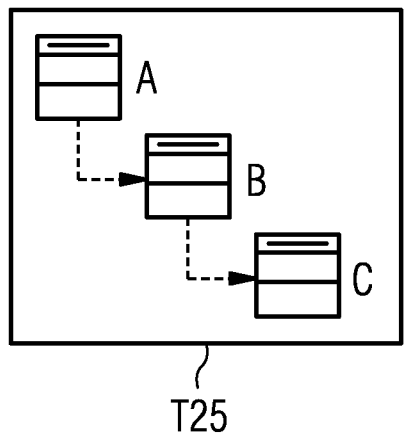
T25
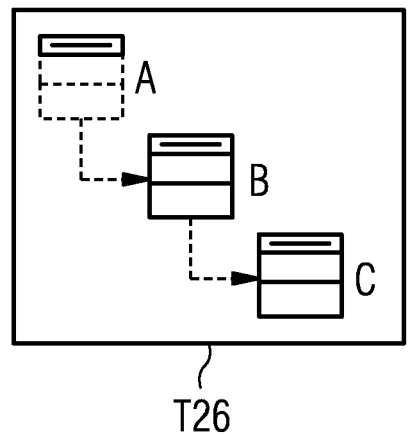
T26
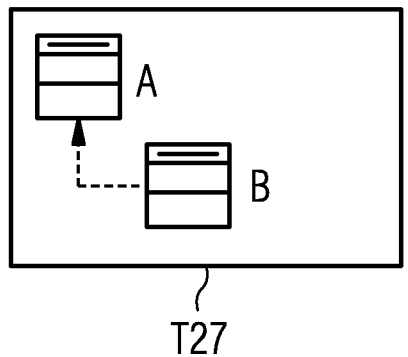
T27
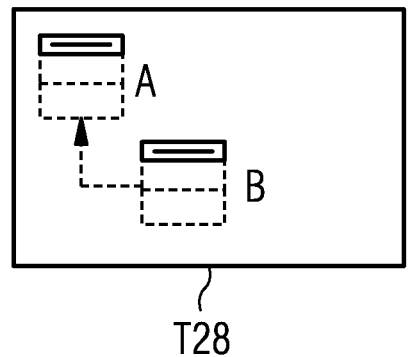
T28

ACCESSING ENTITIES OF DATA ACCESS LAYER

CROSS-REFERENCE TO RELATED APPLICATION

This application claims the priority, under 35 U.S.C. §119, of European application EP 10166330, filed Jun. 17, 2010; the prior application is herewith incorporated by reference in its entirety.

BACKGROUND OF THE INVENTION

Field of the Invention

The present invention relates to a method and to a system for accessing entities of a Data Access Layer.

The majority of business and manufacturing processes use database management systems to store and retrieve data, i.e. the information needed to carry out their tasks. A conceptual description of such information for a particular domain of interest is called a "physical data model".

Software applications are usually kept separate from the database structures used to handle the physical data model information at the "database level" (DB level). This is done by a "Data Abstraction Layer" (DAL), which is an implementation of a "logical data model". A very common type of logical data model is the "Entity-Relationship Model" (ERM), in which data are depicted in terms of entities, i.e. data structures representing real world objects, and relationships between them.

For instance, in a production environment data model, e.g. in a Manufacturing Execution System (MES), we could state that "a machine belongs to a particular production line". In this example, "machine" and "production line" are entities of our data model, while "belongs to" is a relationship between them.

Above the data model lays the description of the set of algorithms, constraints and rules applied to the information: this is the "Business Logic" (BL) level. For instance, referring to the previous example, we could say that "a person can operate a specific machine only if he/she has a specific set of skills". "Person", "machine" and "skill" are entities of our logical data model, "has" is a relationship between person and skill, and the above sentence is a constraint imposed by our business logic.

When developing a generic software solution in a specific domain, both at DB and DAL levels, the information is typically structured in a fixed data model: entities and relationships are defined on the basis of a generic knowledge about the real process. The same applies at business logic level, where the implemented algorithms, rules and constraints are required to suit all the specific situations in which the solution will be used.

Unfortunately, a major drawback is that heavy customizations are often needed at DB, DAL, BL levels whenever the generic solution is applied to specific situations.

A simple example illustrating this problem is the dealing with information related to a person. In a generic data model, the entity corresponding to a person contains all the properties that in general represent a person in our domain of interest, e.g. in this example a Human Resources management system: first name, surname, date and place of birth, and so on. If this generic data model is used in the USA, it needs to be expanded to include the important SSN (Social Security Number) information, which uniquely identifies a person in that country for taxation purposes. In this extremely simple case of an additional property, the customization at DB level is an additional column in a table or an additional table in 1:1 relation with the existing one.

As regards the data reading process, at the DB level, it is very simple to modify read statements to include the newly added property via the SQL join clause, but, unfortunately, the same is not true at DAL level.

Moreover, the majority of problems arise when customizing the data writing process. In fact, relational databases have no write construct corresponding to the "join" clause used for reading. At DAL and BL levels, the problem is even more complex, in fact pre-existing write logic implemented by the basic entities have to be kept/extended/overwritten in different situations.

As illustrated by this very simple example scenario, it is evident how common customizations, when applying a general solution to a specific case, require to include additional entities, properties and relationships and additional different behaviours, constraints and checks.

A requirement in the art is thus to adapt the data model of a specific solution which often differs from the generic data model implemented by a general purpose solution by customizing the DAL layer in an efficient and flexible manner. Unfortunately, the customization of the DAL layer is typically done by partially or totally substituting the product persistence layer, which implies considerable development efforts.

Hence, in real situations, it often happens that the generic product DAL and BL layers are typically discarded and rewritten from scratch, in order to obtain the elasticity and the flexibility typical of physical data handling layer. This is due to the fact that at the DAL level, the entities are rigid and data of two or more entities are not groupable in efficient way.

Unfortunately a major disadvantage of skipping the DAL layer is that some persistence functionality for the entities of the data model may be lost and with it some control and check capabilities useful for the programming phase.

SUMMARY OF THE INVENTION

It is accordingly an object of the invention to provide a method and device for accessing of entities of a data access layer which overcome the above-mentioned disadvantages of the prior art methods and devices of this general type, and achieving, also for the upper data layers, the flexibility typical of accessing the database physical layer.

The aforementioned aim is achieved by a method and a system for accessing entities of a Data Access Layer, the Data Access Layer following an entity-relationship model in which data are depicted in term of entities and relationships between them; wherein the entities are provided with a CRUD interface. The method includes: a) defining a meta-entity, hereinafter referred as a virtual entity, resulting as a composition of parts of one or more entities; b) describing the virtual entity, via a virtual entity descriptor, as a hierarchical structure in which entities are connected in a parent-child structure via a link, in the virtual entity descriptor, specifying which properties are taken from each entity to form partial entities of the virtual entity; c) providing a CRUD interface on the virtual entity; d) and at run time, accessing the virtual entity via its CRUD interface. The accessing is implemented as a set of calls to CRUD methods accessing the entities composing the virtual entity.

In embodiments of the proposed invention, the links connecting parent and child entities may conveniently be selected from the group consisting of one or more of the following: straight links, wherein the parent entity includes a set of property referencing the child entity; back-links, wherein the child entity includes a set of property referencing the parent entity; and pivot back-links, wherein a set of child-entity properties is replicated once for every desired value of a given pivot identifier.

In embodiments of the proposed invention, at least one child entity may advantageously be an optional sub-entity implying that the relationship between the parent entity and the child entity itself is not mandatory.

In embodiments of the proposed invention, at least one straight-linked child entity may conveniently be a look-up sub-entity implying that at least one set of properties is marked as identifier uniquely identifying sub-entity instances and the lookup sub-entity is used for locating specific instances on the basis of its set of identifiers and for reading its properties from a repository so that link properties referencing the set can be updated in the parent entity.

In embodiments of the proposed invention, information on entities may be stored in a repository which may be a database, preferably a relational database.

In embodiments of the proposed invention, the accessing of the virtual entity of item d) may either be performed via a read method or via a write method.

In embodiments of the proposed invention, the read method on the virtual entity may preferably be implemented as a call of read methods on the entities composing the virtual entity.

In embodiments of the proposed invention, a collection of virtual entity instances may advantageously be implemented by a selection of the group consisting of one or more of the following: ".NET" standard objects; Microsoft DataSet and/or DataTable objects bounded to Microsoft ObjectDataSource; and other standard representations suitable to provide data to third-party ASP.NET controls.

In embodiments of the proposed invention, the write method may be an edit method in which: a check is performed on the hierarchical structure of the virtual entity in order to decide the processing order of each of its partial entities: if the child entity is linked to the father entity with a straight link, the child entity is processed before the father entity; if the child entity is linked to the to the father entity with a back link, the child entity is processed after the father entity; wherein the processing of each partial entity comprises the following sub-steps: the partial entity is examined to check whether it is to be modified or not; if it is to be modified: the up-to-date full entity instance is retrieved from the database; a check is performed on the hierarchical position of the current partial entity: if the current partial entity is the root entity or is straight-linked to its father: it is retrieved either through one of its lookup identifiers if marked as looked-up or through one of its unique keys; if it is successfully retrieved, it is updated with new values on the database, unless it is a lookup entity which is not marked as "updatable"; otherwise, if the current partial entity is back-linked to its father: if the current partial entity is not retrievable through a unique key, an entity instance with the new values is created; otherwise if all the new values of its accessible properties are null, the full entity instance is removed from the database, otherwise, if at least one new value of an accessible property is not null, the current partial entity is updated with the new values.

In embodiments of the proposed invention, the write method may also be a delete method in which: if the child entity is linked to the father entity with a back link, the child entity is deleted before and the father entity is deleted afterwards; otherwise, if child entity is linked to father entity with a straight link, only the father entity is deleted.

In embodiments of the proposed invention, for at least one of the methods of the CRUD interface of at least one entity, at least a plugin to be executed at run time may preferably be associated, wherein a plugin is an external software module implementing a custom action.

In embodiments of the proposed invention, wherein the at least one entity may conveniently be a virtual entity.

In embodiments of the proposed invention, the entities may be custom entities, generated in a dynamic way with the information contained in a dynamic entity descriptor structure. Wherein the dynamic entity descriptor structure contains the following information: information on how entities are represented in the Data Access Layer; information on how entity data are stored in the repository; and information on how entities are to be written and which external providers are called to perform write operations.

Furthermore, a computer program element can be provided, containing computer program code for performing steps according to the above mentioned method when loaded in a digital processor of a computing device.

Additionally, a computer program product stored on a computer usable medium can be provided, comprising computer readable program code for causing a computing device to perform the mentioned method.

With embodiments of the proposed invention, data model information is handled in an efficient way while it is minimized the development effort usually required in identifying common structures and behaviors pertaining to data in a specific domain.

Embodiments of the proposed invention allow high-performance and flexible composition of data belonging to different entities, both in read and write operations.

Embodiments of the proposed invention allow, at the DAL layer, for both read and write operations, a similar kind of flexibility that the SQL language provides at database level for read operations.

Embodiments of the proposed invention allow complete or partial customization of the BL layer.

Embodiments of the proposed invention do not require the development of custom data-access classes.

With embodiments of the proposed invention, it is very straightforward to compose the basic building blocks, library or dynamically defined entities, to carve the desired logical data model. In fact, in this process of composition, the choice to either preserve the original business logic or expand/rewrite it to fit the specific model needs, can concern only a particular action on a small part of the virtual entity, as well as the whole virtual entity.

Embodiments of the proposed invention allow the exposition of a uniform interface, i.e. set of interaction rules for all data model entities an application has to deal with, from basic library entities to complex aggregates consisting of many standard and custom sub-entity behaviors.

Other features which are considered as characteristic for the invention are set forth in the appended claims.

Although the invention is illustrated and described herein as embodied in a method and device for accessing of entities of a data access layer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 8 is an illustration of diagrams schematically illustrating different examples of virtual entities defined as hierarchical structures of real entities according to example embodiments of the proposed invention;

DETAILED DESCRIPTION OF THE INVENTION

According to the proposed invention, the DAL layer follows an ERM model in which data are depicted in term of entities and relationships between them.

The entities expose a CRUD interface, i.e. they support, where applicable, the four basic storage operations: Create, Read, Update, Delete. It is noted that the minimal CRUD interface requires that at least a Read operation is supported.

The proposed invention introduces the concept of "entity aggregation" according to which two entities can be aggregated if a relationship exists between them, i.e. if one entity contains a reference to the other entity. The aggregation can be iterated, thus giving a hierarchical structure, i.e. a tree of aggregated entities. The result of such aggregation is the meta-entity called "virtual entity". The description of how base entities are linked in order to obtain the virtual entity is called a "virtual entity descriptor" and virtual entities automatically expose a CRUD interface.

The entities declare allowed links (relationships) between them. This occurs whenever an entity contains a reference to another entity, i.e. a set of properties that uniquely identify an instance of the other entity.

The Virtual Entity Descriptor is a hierarchical, i.e. tree-like, structure in which child entities are connected to parent entities through "link" properties and in which it is specified which properties are taken from the set of different entities of the structure to form the new virtual entity. In other invention embodiments, such properties may preferably be given a new name, "alias".

The proposed invention may be implemented as a framework based on an entity-relationship logical data model. The virtual entity descriptor may be then seen as a class of the framework. The virtual entity descriptor may be preferably serialized and deserialized for being easily used without writing code, e.g. a feasible representation being XML language.

Advantageously, with the proposed invention, the DAL and BL layers of a specific solution can be based on virtual entities instead of class objects. In fact, the proposed invention by providing a library of virtual entity descriptors avoids the necessity of constantly expanding library of custom aggregated business objects with its evident drawbacks in term of application and deployment efforts.

At run time, the virtual entities are accessed via their CRUD interface. The access, either via a read or write method, is implemented as a set of calls to CRUD methods accessing the entities composing the virtual entity.

Figure 1:
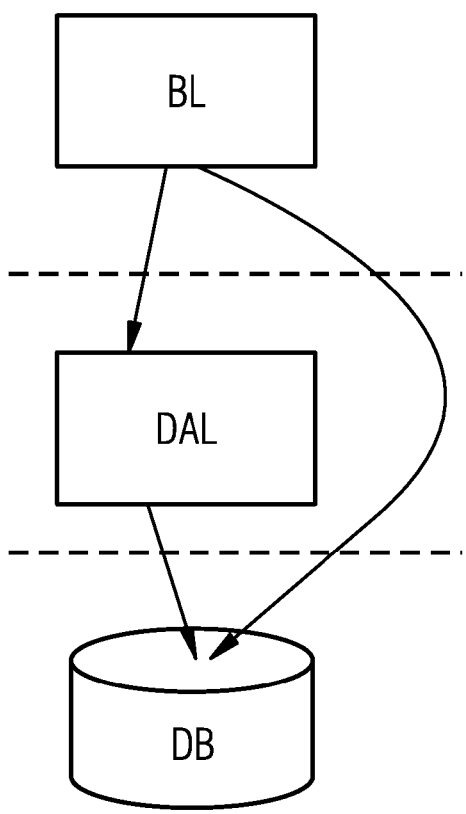
FIG. 1 is a block diagram schematically illustrating a 3-tier data model for data access according to the prior art.
Figure 2:
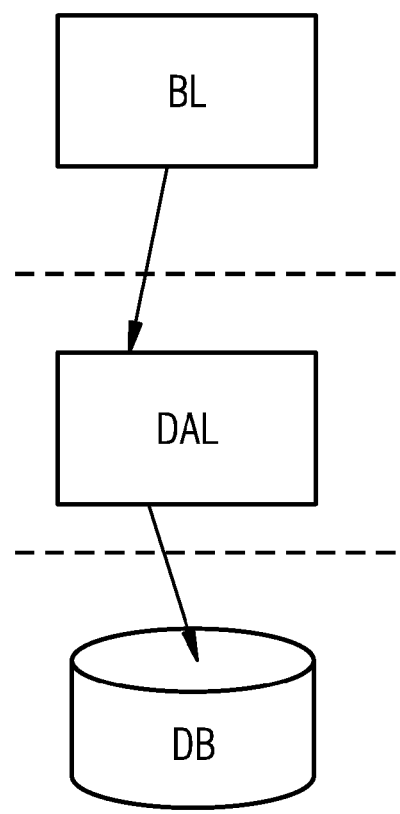
FIG. 2 is a block diagram schematically illustrating a 3-tier data model for data of an example embodiment according to the invention.

FIG. 1 and FIG. 2 schematically illustrate the differences of the 3-tier data model for data access in the prior art and in an invention example respectively. At the BL level, in the prior art as shown in FIG. 1, there are per-solution customizations which implement specific business logic as classes instead, in an example embodiment as shown in FIG. 2, there are definitions of business entities as virtual entity descriptors and, optionally, of plugins.

At the DAL level, in the prior art as shown in FIG. 1, there are generic domain entities while, in an example embodiment as shown in FIG. 2, there are generic domain CRUD entities. In FIG. 2, the definition of virtual entities at the BL level does not require a direct access to the database level and the skipping of the DAL level as it is often the case for prior art solutions as shown in FIG. 1.

Link Types

In a virtual entity, sub-entities, i.e. child entities, may be straight-linked or back-linked to a parent entity. In other embodiments, a back link may also be a pivot-link.

Herein, the term "straight-linked" sub-entity indicates that the parent entity includes a set of properties referencing the sub-entity. Instead with the term "back-linked" sub-entity, it is intended that the sub-entity references the parent entity.

The differences between a straight link, a back link and a pivot link are illustrated with Examples 1, 4 and 5.

EXAMPLE 1

A Straight-Link

In an example embodiment, in a MES scenario, let us assume that the following three basic DAL entities are part of the production order management component:

"Campaign" entity, representing a production request to make a specific quantity of a product.

"Order" entity, representing the operations needed for producing a specific material, along with related information. A campaign consists of one or more orders.

"Entry" entity: representing the manufacturing steps for completing the execution of an entire production order. An order consists of one or mode entries.

A very simple example of virtual entity may aggregate the following property data:

the entry identifier (taken from Entry);
the entry estimated start time (taken from Entry);
the entry estimated end time (taken from Entry);

the identifier of the order to which the entry belongs (taken from Order);

the identifier of the final material generated by the order (taken from Order);

the identifier of the campaign to which the order belongs (taken from Campaign); and the campaign status (taken from Campaign).

Figure 3:
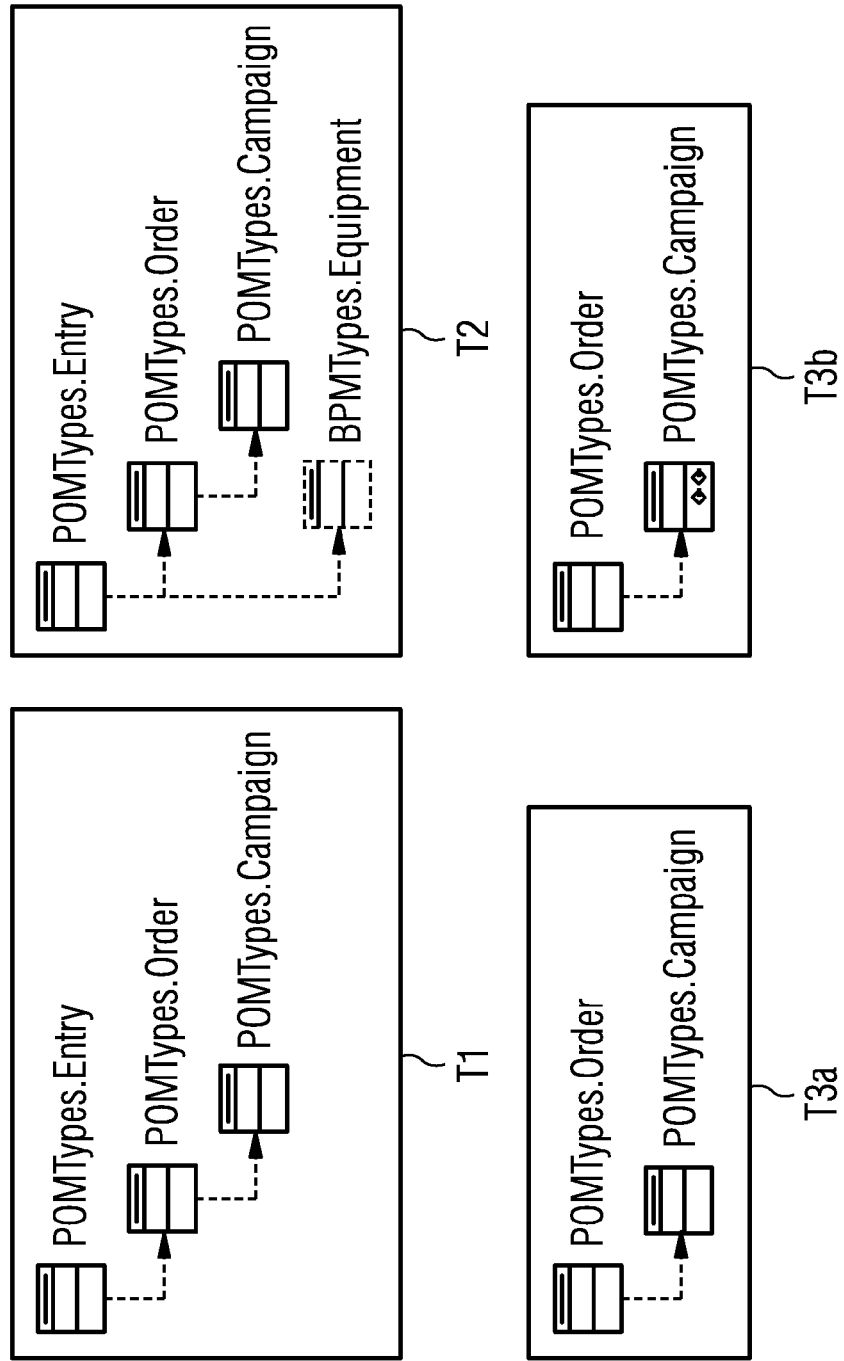
FIG. 3 is an illustration of diagrams schematically illustrating different examples of virtual entities defined as hierarchical structures of real entities according to example embodiments of the proposed invention.

In this simple example case, the virtual entity is graphically represented as a tree of three cascaded straight-linked entities as shown in virtual entity diagram T1 of FIG. 3.

The link properties in this example are the order identifier, exposed by both Order and Entry entities, and the campaign identifier exposed by both Campaign and Order entities.

Sub-Entity Types

In embodiments of the proposed invention, other two types of sub-entities may be provided, as for example, "optional" sub-entities or "look-up" sub-entities.

Optional Sub-Entities

According to the first additional sub-entity type, a sub-entity may be marked as an "optional" sub-entity if the relationship between the parent entity and the sub-entity itself is not mandatory, i.e. the referencing entity does not necessarily point to an instance of the referenced entity.

EXAMPLE 2

An Optional Sub-Entity

In an example embodiment, let us assume that the Entry entity contains a property called EquipmentID referencing the execution Equipment associated to the entry, if any, as shown in virtual entity diagram T2 of FIG. 3.

In this case, since the association is not mandatory, i.e. an entry does not necessarily have associated equipment, such sub-entity is marked as optional. Read methods invoked on this virtual entity descriptor return all the Entry instances, regardless of their pointing to related Equipment or not. For the virtual entity instances for which the association to the Equipment entity is not present, the properties extracted from the Equipment entity have null values.

Look-Up Sub-Entities

According to the second additional sub-entity type, a straight-linked sub-entity may be marked as "look-up" sub-entity.

Lookup sub-entities require that at least one set of properties is marked as "identifier" which uniquely identifies sub-entity instances.

In look-up sub-entities, write methods are implemented in a different manner than for non look-up sub-entity, while the implementation of the read method is not affected. In fact, a lookup sub-entity is not meant to be written but it is meant to be used for locating specific instances on the basis of its set of identifier and for reading its property from the repository so that link properties referencing them can be updated in the parent entity.

During writing, a sub-entity instance matching the values given to at least one identifier is searched and read from the database, and all link properties are updated in the parent entity. The result is that the sub-entity is not modified, but the update takes place in the parent entity which may then reference a different instance.

In other embodiments of the invention, sub-entities with a hybrid look-up behaviour may also be provided, herein called "creatable" and/or "updatable" lookup sub-entities. In "creatable" lookup sub-entities, if no matching sub-entity instance is found, a new one is created with the given property values, and the parent entity will reference it. In "updatable" sub-entities, when the matching sub-entity instance is identified and retrieved any modified property is updated in the database.

EXAMPLE 3

A Look-Up Sub-Entity

Virtual entity diagrams T3a and T3b of FIG. 3 depict two virtual entity descriptors differing in that in the second virtual entity descriptor the Campaign sub-entity is marked as "lookup". For the first virtual entity, the invocation of a write method on an instance of this virtual entity implies that write methods on both the Order and Campaign instances may be invoked, depending on data.

Instead, for the second virtual entity, the invocation of a write method on an instance of this virtual entity implies that that only the Order instance is written and, in particular, it points to the Campaign instance matching the values given for its "identifier properties", e.g. Campaign.Name.

Pivot-Links

In embodiments of the proposed invention, it is preferred to mark some back-linked sub-entity as pivot linked sub-entities.

In fact, it is noted that in back-links, sub-entities reference parent entities through one or more properties. Unfortunately, this implies that, unless the relation is one to one, in the resulting set of virtual entity instances, property values coming from the parent entity are repeated, since there might be several sub-entity instances referencing the same parent entity instance. Pivot links do not have such a drawback as it is illustrated with Examples 4 and 5, depicting the difference between a back-link and a pivot-back-link.

EXAMPLE 4

Back-Linked Sub-Entities

Let us assume that an entity EntryProperty represents a property associated to an Entry entity. It references the Entry property through property EntryID and exposes a Name property representing the property name. Values taken by EntryProperty instances are represented by the EntryPropertyValue entity, which references EntryProperty by means of property EntryProperty.Name and exposes a Value property representing the property value, as shown in virtual entity diagram T4 in FIG. 4.

A sample set of resulting virtual entity instances is exemplified in Table 1.

TABLE 1

| Entry.ID | EntryProperty.Name | EntryPropertyValue.Value |
|---|---|---|
| entry1 | propA | v1a |
| entry1 | propB | v1b |
| entry1 | propC | v1c |
| entry2 | propA | v2a |
| entry2 | propB | v2b |
| entry3 | propB | v3b |
| entry3 | propC | v3c |
| entry3 | propD | v3d |

There are many common scenarios in which such kind of data aggregation is not useful.

Hence, in some of these scenario, it is desirable to have a "pivoted" sub-entity data organization, in which a set of sub-entity properties (and sub-sub-entities) is replicated once for every desired value of a given "pivot identifier". The pivot identifier is a set of properties of the pivoted sub-entity whose values are used to identify instances to be pivoted in the virtual entity. These values are called "pivot values". If N pivot values are specified for a given pivoted sub-entity, the sub-tree starting from it will be replicated N times, one for each pivot value.

EXAMPLE 5

Pivot-Linked Sub-Entities

Figure 4:
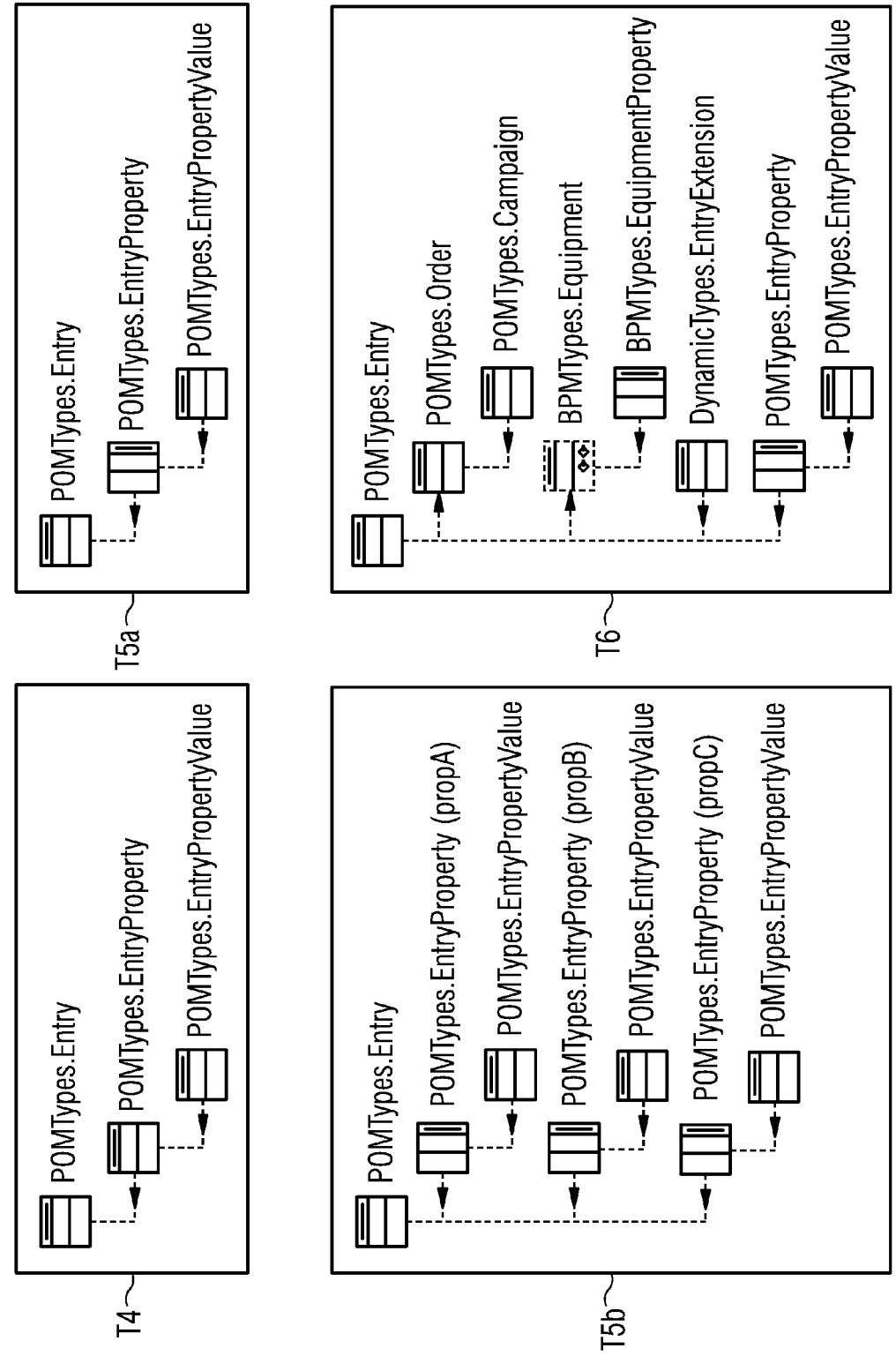
FIG. 4 is an illustration of diagrams schematically illustrating different examples of virtual entities defined as hierarchical structures of real entities according to example embodiments of the proposed invention.

In this example, compared to Example 4, the resulting virtual entity is completely different since EntryProperty is pivoted on its Name property as shown in virtual entity diagram T5a of FIG. 4.

Supposing 3 pivot values, "propA", "propB", "propC", are given, the sub-structure starting from EntryProperty is internally replicated 3 times, as shown in virtual entity diagram T5b of FIG. 4.

Thus, the pivot values become prefixes of the replicated properties as exemplified in Table 2. Advantageously, independent aliases may be specified.

TABLE 2

| Entry.ID | propA<br>EntryPropertyValue.Value | propB<br>EntryPropertyValue.Value | propC<br>EntryPropertyValue.Value |
|---|---|---|---|
| Entry1 | v1a | v1b | v1c |
| Entry2 | v2a | v2b |  |
| Entry3 |  | v3b | v3c |

Conveniently, the same sample data shown in Table 1 of Example 4 may be represented by this virtual entity in a more useful form as shown in Table 2.

Advantageously, with pivot linked sub-entities, a user friendlier way of data organization is achieved since the redundant duplication of data of the root entity is avoided. As shown in Examples 4 and 5, Table 2 contains only 3 rows whereas Table 1 contains 8 rows.

In fact, application often requires that data is organized in a table without unnecessary redundancies as it is the case resulting from the SQL join command in relational databases.

It is noted that pivoted entities are optional by definition. In fact, in this example, entry2 has no property named "propC" and entry3 has no property named "propA" and thus the corresponding virtual instance properties are set to null.

When an entity references another entity in a 1:1 relation it can be called an "extension" of it. Advantageously, in invention embodiments, extension entities may be dynamically generated and used in virtual entities as back-linked sub-entities of the entities they extend.

EXAMPLE 5a

Another Example of Pivot-Linked Sub-Entities

In this example, two entities are in used, Person and PersonCustomAttribute. The Person entity exposes the following four properties: Code, Name, Surname and Email, wherein the Code property is a number that uniquely identifies a person.

The PersonCustomAttribute entity exposes the following three properties: AttributeName, AttributeValue and PersonCode. The PersonCode property identifies the person to whom the attribute is referred.

Let us assume that three Person instances are stored in a repository.

The first person has the following data:

Code: 1

Name = John
Surname = Smith
Email = jsmith@hotmail.com

The second person has the following data:

Code: 2

Name = Mary
Surname = Williams
Email = mary.williams@gmail.com

The third person has the following data:

Code: 3

Name = James
Surname = Moore
Email = jamesm@email.com

Let us assume that John Smith has two associated custom attributes telling that he has black eyes and brown hair, while Mary Williams has three associated custom attributes telling that she has blue eyes, she weighs 55 Kg and she is 165 cm tall. James Moore has no associated custom attributes.

Thus, the repository contains the following five Person-CustomAttribute instances:

AttributeName = eyes
AttributeValue = black
PersonCode = 1
(=> "John Smith has black eyes")
AttributeName = hair
AttributeValue = brown
PersonCode = 1
(=> "John Smith has brown hair")
AttributeName = eyes
AttributeValue = blue
PersonCode = 2
(=> "Mary Williams has blue eyes")
AttributeName = weight
AttributeValue = 55
PersonCode = 2
(=> "Mary Williams weighs 55")
AttributeName = height
AttributeValue = 167
PersonCode = 2
(=> "Mary Williams is 167 cm tall")

Such data can also be represented in a compact tabular form via Table 3 for the persons and via Table 4 for the PersonsCustomAttributes.

TABLE 3

| Code | Name | Surname | Email |
|---|---|---|---|
| 1 | John | Smith | jsmith@hotmail.com |
| 2 | Mary | Williams | mary.williams@gmail.com |
| 3 | James | Moore | jamesm@email.com |

TABLE 4

| AttributeName | AttributeValue | PersonCode |
|---|---|---|
| Eyes | black | 1 |
| Hair | brown | 1 |
| Eyes | blue | 2 |
| Weight | 55 | 2 |
| Height | 167 | 2 |

Figure 5:
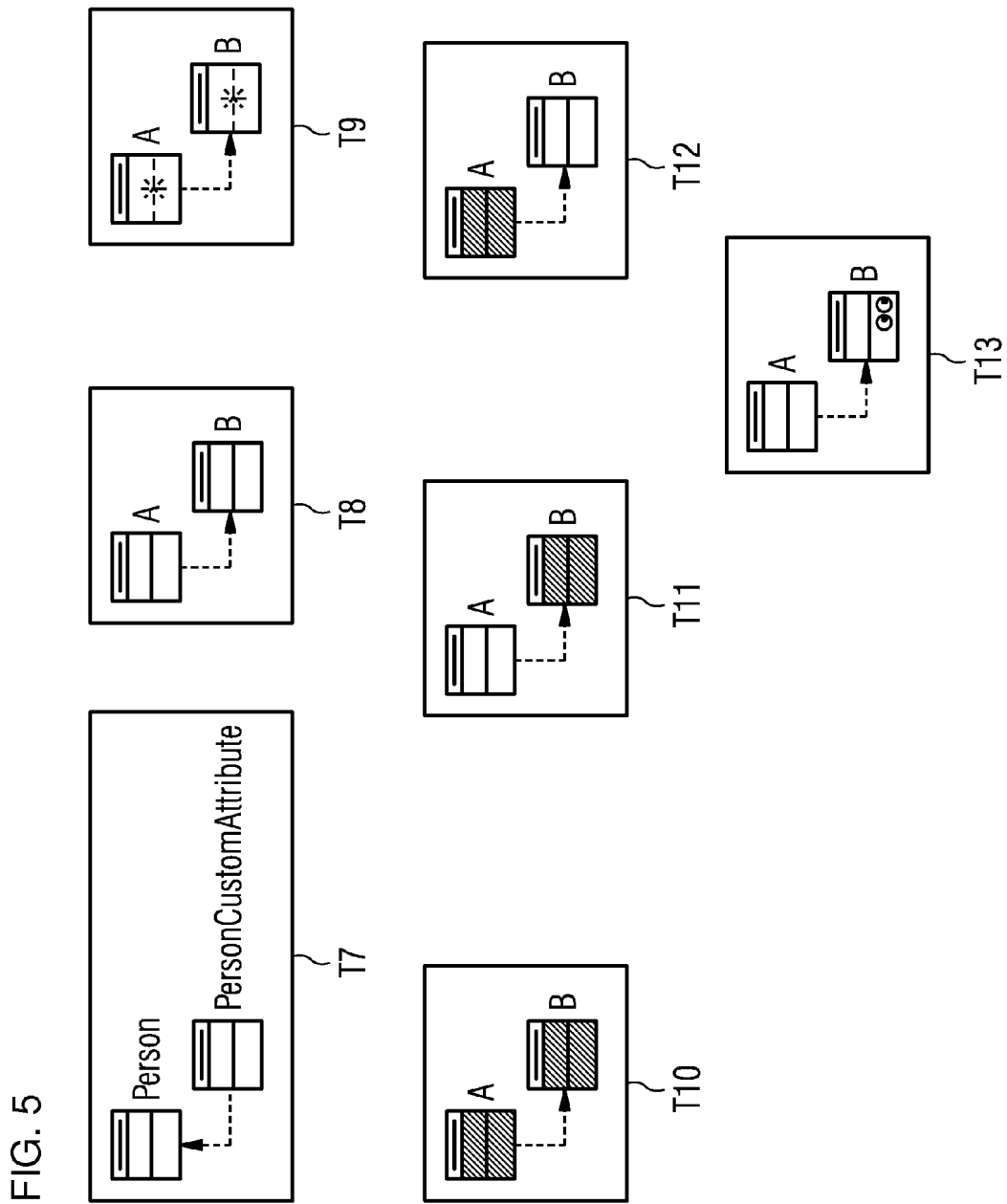
FIG. 5 is an illustration of diagrams schematically illustrating different examples of virtual entities defined as hierarchical structures of real entities according to example embodiments of the proposed invention.

A corresponding virtual entity is described as shown in virtual entity diagram T7 of FIG. 5, assuming that properties Name and Surname are taken from Person and AttributeName and AttributeValue from PersonCustomAttribute.

Such virtual entity has the virtual instances shown in Table 5.

TABLE 5

| Name | Surname | AttributeName | AttributeValue |
|---|---|---|---|
| John | Smith | eyes | black |
| John | Smith | hair | brown |
| Mary | Williams | eyes | blue |
| Mary | Williams | weight | 55 |
| Mary | Williams | height | 167 |

It is noted that in Table 5 James Moore is not present, since he has no custom properties associated to him. Instead, in case the sub-entity PersonCustomAttribute is marked as "optional" in the virtual entity descriptor, the virtual entity has an additional instance as shown in Table 6.

TABLE 6

| Name | Surname | AttributeName | AttributeValue |
|---|---|---|---|
| John | Smith | Eyes | black |
| John | Smith | Hair | brown |
| Mary | Williams | Eyes | blue |
| Mary | Williams | Weight | 55 |
| Mary | Williams | Height | 167 |
| James | Moore | | |

In an alternative virtual entity descriptor, the PersonCustomAttribute may be advantageously inserted as a pivoted entity. In this case, it is specified which is the PersonCustomAttribute property to be used as "pivot property" and a set of "pivot values" for it. For example, AttributeName is specified as pivot property and "eyes", "hair" and "weight" as pivot values. The resulting virtual instances are shown in Table 7.

TABLE 7

| Name | Surname | eyes | hair | Weight |
|---|---|---|---|---|
| John | Smith | Black | brown | |
| Mary | Williams | Blue | | 55 |
| James | Moore | | | |

EXAMPLE 6

Summary Example with Different Types of Sub-Entities

In order to illustrate how embodiments of the proposed invention may be able to fit also very complex real situations, a sample virtual entity descriptor comprising straight-, back-, pivot-, lookup and optional sub-entities is hereby presented.

Let us assume that a data model for a specific application contains an enriched concept of product order "entry" consisting of:
some properties of Entry;
some properties of the Order to which the Entry belongs;
some properties of the Campaign to which the Order belongs;
some properties of the Equipment used for Entry execution (if any), with lookupcapability (changing the value of EquipmentName means to associate the entry to a different Equipment, or no Equipment if null);
some properties of EquipmentProperty, pivoted on a given set of values for EquipmentProperty.ID;
some properties of EntryExtension, a dynamically generated entity that represents additional application-specific data associated to entries; and
some properties of EntryPropertyValue, pivoted on a given set of values for EntryProperty.Name.

Such virtual entity can be described as shown in virtual entity diagram T6 of FIG. 4.

CRUD Interfaces

Accessing methods for accessing the virtual entities are exposed via a CRUD interface. Such accessing methods comprise, where relevant, a Read method and three Write methods, i.e. Create, Read and Delete methods.

Read Methods for Virtual Entities

In the CRUD interface for virtual entities, a read method on a virtual entity is implemented as a call of read methods on the entities composing the virtual entity.

In invention embodiments, the repository for storing entities is a database, preferably a relational database.

In relational databases, reading methods for virtual entities are implemented by generating and executing a single query. In invention embodiments, this may be achieved by providing, in the internal architecture (i.e. the base classes constituting the framework), the entities description with the detailed information about how they are persisted in the database, i.e. which fields/expressions referring to which tables/views hold the data externally represented as entity properties.

Advantageously, by executing the read methods through a single query to a relational database, the goal of maximum performance in read is achieved.

Moreover, abstract-level filtering, sorting, and server-side paging functionalities may be implemented, allowing the developer to fine-tune database throughput.

Read methods return collections of virtual entity instances. In invention embodiments, several implementations are possible suiting different application fields.

For example, in a first implementation, there may be a .NET standard Collection<> of VirtualEntityInstance objects to be used when writing .NET applications using the virtual entity descriptors. In this implementation, a VirtualEntityInstance is a class defined in the framework handling aggregated entities and implementing the methods to access virtual entity instances.

In a second implementation, there may be Microsoft DataSet and/or DataTable objects that can be directly bound to Microsoft ObjectDataSources in order to obtain a table-like or form-like graphical representation without writing .NET code.

In an other implementations, there may be other standard representations suitable to provide data to third-party ASP-.NET controls, e.g. charts, graphs, trees.

Write Methods for Virtual Entities

Each of the three Write methods acts according to the information stored in the virtual entity descriptor.

The Create and Delete methods require a single virtual entity instance representing the compound object to be created or deleted. Instead, in a preferred embodiment of the invention, the Edit method may require both current, i.e. old, and desired, i.e. new, versions of the compound object. In fact, editing a virtual entity which is a compound of more than one partial entities may resolve to the creation, modification or deletion of each partial entity instance.

In this preferred embodiment, in which the Edit method requires old and new values, a Create method may be implemented as a special case of the Edit method in which the "old" virtual entity instance properties are null.

Other Attributes in the Virtual Entity Descriptor

Advantageously, some properties in the virtual entity descriptor may be marked as read-only or hidden. Such attributes may be taken into account by the write methods in specific situations, as shown in a below example.

Transaction Support

Preferably, entities involved in an aggregate write operation may expose Create, Edit and Delete atomic methods supporting distributed transactions. This advantageously allows a rollback of the entire transaction if something fails. A distributed transaction is either initialized by the aggregate method or an externally created one is used.

Unique Keys

Each entity in the framework exposes the information about which sets of properties constitute the keys uniquely identifying its instances. Each entity may have on or more unique keys. In some cases, an entity may not have a defined unique key: in such cases the unique key is constituted by all the entity properties.

Unique keys may be used to retrieve up-to-date instances and integrate properties not contained in partial entities before writing, and by the delete method of each entity involved in an aggregate.

Data Dependencies

Some entities have data dependencies from other entities. This means that, regardless of how these entities are hierarchical organized (father/child) in the virtual entity descriptor, an intermediate step in the execution of write methods consists of copying some property values from an entity to another. In general, entity properties can be marked with "dependency" attributes telling that their value is inherited by the values of other entities properties.

Link properties are dependent properties by definition. In fact, if entity A references entity B through property P, i.e. A.P corresponds to B.P, the value of A.P is updated whenever a change occurs in the value of B.P.

Edit/Create Methods

In Edit/Create methods, partial entities are processed in an order ensuring that data dependencies are respected; for instance, if partial entity A gets data from partial entity B, A will be processed after B, the most common case being represented by link properties.

Referring to the tree of partial entities defined by the descriptor: if child C is linked to father F with a straight link, C is processed before F; and if child C is linked to father F with a back or pivoted link, C is processed after F.

While processing a partial entity the following steps may typically be performed:
the entity instance is enlisted in current transaction;
the partial entity is examined to check whether it is to be modified or not;
if it is to be modified:
the up-to-date full entity instance is retrieved from the database;
a decision about which action to perform is taken (create/edit/delete);
the action is performed (if unsuccessful, method execution stops and the transaction is roll-backed);
property values are copied to dependent properties in other partial entities, if any.

A partial entity is considered to be modified if:
at least one property is explicitly to be modified (i.e. its old value is different from the new one) or at least one dependent property is implicitly to be updated, e.g. this is typically the case of link properties: if Entity1.Property1 is linked to Entity2.Property2, a change in the value of Property2 implies updating Property1) or the partial entity is pivoted and one of its sub-entities is to be created, e.g. in this case a new instance of the pivoted entity must be created too.

The decision of which action to perform differs from straight-linked to back-linked sub-entities.

For Straight-Linked Sub-Entities, the Action Decision is as Follows.

If current partial entity is the root entity or is straight-linked to its father, it is retrieved either through one of its lookup identifiers or through one of its unique keys, depending on whether it has been marked as "lookup" or not. When multiple identifiers are defined, the first non-null identifier is used to retrieve the entity instance.

Successful retrieval means that the entity instance already exists: it will be updated on the database, unless it is a lookup entity not marked as "updatable". Unsuccessful retrieval means that the entity instance is new: it will be created on the database, unless it is a lookup entity not marked as "creatable".

Instances of entities for which no unique key is defined are deleted and re-created; the common case being entities representing associations between other entities or, in other words, implementing many-to-many relations.

Finally, if all lookup identifiers in a lookup entity are null this means that the caller wants to dissociate it from its father: no action will be taken on the database and the link property will be set to null in the referring entity.

For Back-Linked Sub-Entities, the Action Decision is as Follows.

If current partial entity is back-linked to its father an attempt to retrieve it through its unique keys is made. If the retrieval attempt is unsuccessful, the instance is created. Otherwise, its "accessible" properties are examined to decide what action is needed. A property is "accessible" when it is both visible (i.e. not hidden) and editable (i.e. not read-only) or taken from another partial entity (as dependent properties). If all accessible properties are null, this means that the intent of the caller is to delete the instance, so it will be removed from the database, otherwise it is updated with the new values.

Pivoted entities, as above explained, are handled as a set of independent back-linked entities, one for each pivot value. This means that all included properties and sub-entities are internally replicated in order to have one copy for each value in the pivot values set.

Edit Examples

In the examples, the following symbols are used to illustrate the actions taken on partial entities:

TABLE 8

| Symbol | Logical Method invoked | Action |
|---|---|---|
|  | — | No action |
|  | Create( ) | A new entity instance is created |
|  | Edit( ) | The entity instance is updated |
|  | Delete( ) | The entity instance is deleted |

EXAMPLE 7

Edit of Simple Straight-Linked Sub-Entity

In this example, let us assume that entity A has a straight-linked sub-entity B as shown in virtual entity diagram T8 of FIG. 5.

Let us assume that properties a1, a2, a3 and a_pk are taken from entity A and b1, b2 and b_pk from entity B (a_pk and b_pk being the unique keys for the two entities). In a typical application, a_pk and b_pk may be marked as "hidden". The partial entities processing order is: first entity B then entity A.

Sample Case 7.1: Creation

In this sample case, as shown in Table 9, values are specified in newData, providing new values for properties a1, a2, a3, b1 and b2. Previous values are all null, and both primary keys are null as well.

TABLE 9

| Property alias | Previous value | New Value |
|---|---|---|
| a1 |  | a_val1 |
| a2 |  | a_val2 |
| a3 |  | a_val3 |
| a_pk |  |  |
| b1 |  | b_val1 |
| b2 |  | b_val2 |
| b_pk |  |  |

The aggregate Edit method creates a new instance of entity B and a new instance of entity A that refers to it, as shown in virtual entity diagram T9 of FIG. 5.

Sample Case 7.2: Editing Both Partial Entries

In this sample case, new values are given to a1, a2, a3, b1 and b2 as shown with the bold format of Table 10.

TABLE 10

| Property alias | Previousvalue | New Value |
|---|---|---|
| a1 | a_val1 | a_new_val1 |
| a2 | a_val2 | a_new_val2 |
| a3 | a_val3 | a_new_val3 |
| a_pk | 7 | 7 |
| b1 | b_val1 | b_new_val1 |
| b2 | b_val2 | b_new_val2 |
| b_pk | 51 | 51 |

Both entities B and A are updated as also shown in virtual entity diagram T10 of FIG. 5.

Sample Case 7.3: Editing the Sub-Entity Only

In this sample case, new values are given to b1 and b2 as shown with the bold format of Table 11.

TABLE 11

| Property alias | Previous value | New Value |
|---|---|---|
| a1 | a_val1 | a_val1 |
| a2 | a_val2 | a_val2 |
| a3 | a_val3 | a_val3 |
| a_pk | 7 | 7 |
| b1 | b_val1 | b_new_val1 |
| b2 | b_val2 | b_new_val2 |
| b_pk | 51 | 51 |

Only entity B is updated as also shown in virtual entity diagram T11 of FIG. 5.

Sample Case 7.4: Editing the Main Entity Only

In this sample case, new values are given to a1, a2 and a3.

TABLE 12

| Property alias | Previousvalue | New Value |
|---|---|---|
| a1 | a_val1 | a_new_val1 |
| a2 | a_val2 | a_new_val2 |
| a3 | a_val3 | a_new_val3 |
| a_pk | 7 | 7 |
| b1 | b_val1 | b_val1 |
| b2 | b_val2 | b_val2 |
| b_pk | 51 | 51 |

Only entity A is updated as also shown in diagram T12 of FIG. 5.

EXAMPLE 8

Edit of Straight-Linked Lookup Sub-Entity

This example differs from Example 7 in that entity B is marked as "lookup" (non creatable, non updatable) as shown in virtual entity diagram T13 of FIG. 5 and property b1 is declared to be its lookup identifier. Since entity B is defined as neither creatable nor editable, no write operation is allowed on it, which implies that b2 and b_pk are read-only by definition. The partial entities processing order is, again, first entity B, then entity A.

Sample Case 8.1: Creation

New values are specified for a1, a2, a3 and b1. The difference with example 7 is that since b1 is a lookup identifier of B, the given value is used as a key to retrieve that particular instance of B.

TABLE 13

| Property alias | Previous value | New Value |
|---|---|---|
| a1 | a_val1 | a_val1 |
| a2 |  | a_val2 |
| a3 |  | a_val3 |
| a_pk |  |  |
| b1 |  | b_id1 |
| b2 |  |  |
| b_pk |  |  |

Figure 6:
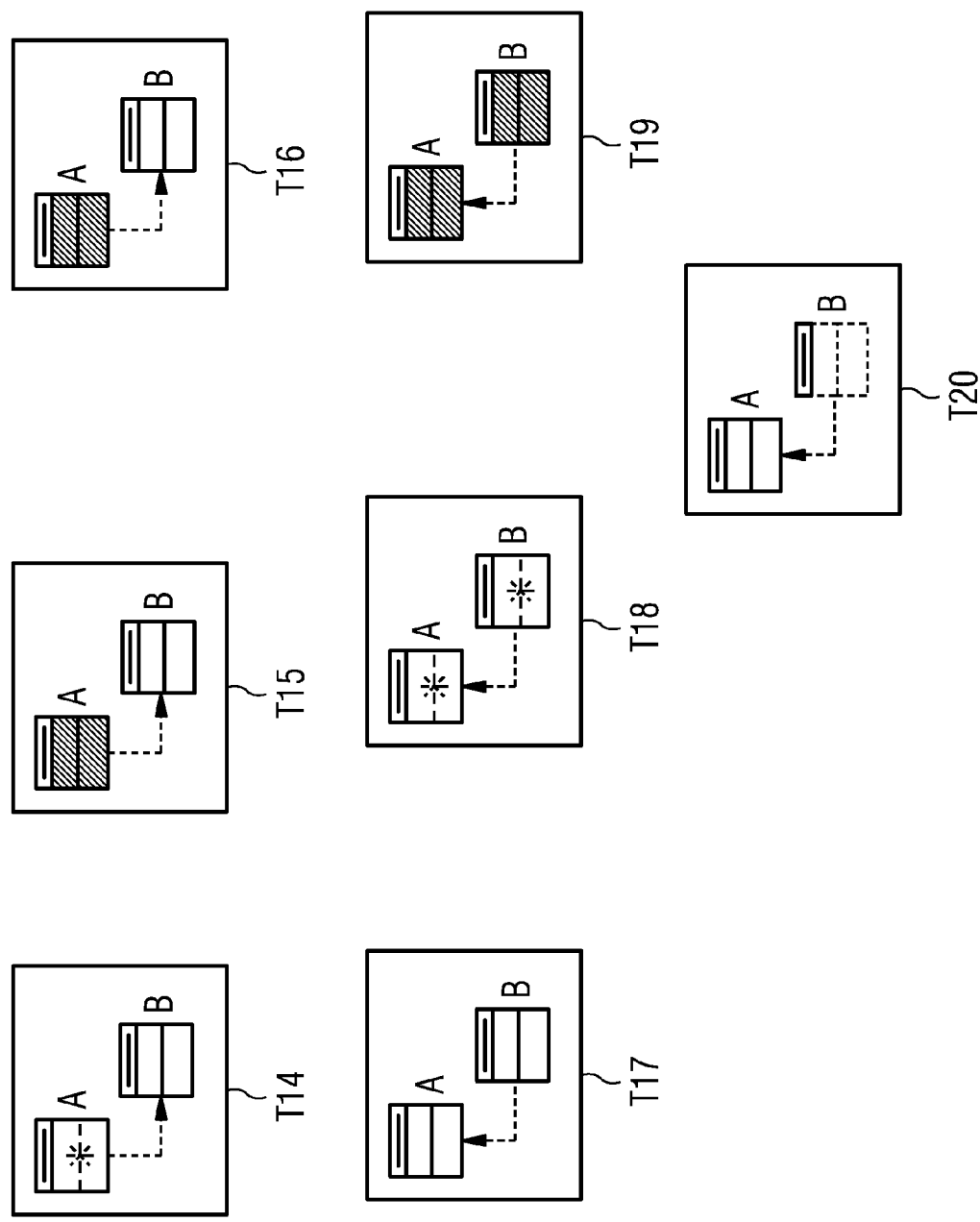
FIG. 6 is an illustration of diagrams schematically illustrating different examples of virtual entities defined as hierarchical structures of real entities according to example embodiments of the proposed invention.

A new instance of entity A referring to the instance of entity B having b1 ="b_id1 " is created as also shown in virtual entity diagram T14 of FIG. 6.

If no instance of entity B having b1 ="b_id1 " exists, the method fails since B is not "creatable", otherwise it would try to create a new instance.

Sample Case 8.2: Edit (or Update)

In this sample case, new values are given to a1, a2, a3 and b1. Since b1 is an identifier of B, changing its value means to make A refer to a different instance of B, which is very different from what shown in Example 7.

TABLE 14

| Property alias | Previous value | New Value |
|---|---|---|
| a1 | a_val1 | a_new_val1 |
| a2 | a_val2 | a_new_val2 |
| a3 | a_val3 | a_new_val3 |
| a_pk | 7 | 7 |
| b1 | b_id1 | b_id2 |
| b2 | b_val2 | b_val2 |
| b_pk | 51 | 51 |

Entity A is updated and linked to another instance of entity B, the one having b1 ="b_id2" as also shown in virtual entity diagram T15 of FIG. 6.

Sample Case 8.3: Unlinking

In this sample case, a null value is given to b1. This means that entity A does not refer to any instance of entity B.

TABLE 15

| Property alias | Previous value | New Value |
|---|---|---|
| a1 | a_val1 | a_val1 |
| a2 | a_val2 | a_val2 |
| a3 | a_val3 | a_val3 |
| a_pk | 7 | 7 |
| b1 | b_id1 | <null> |
| b2 | b_val2 | b_val2 |
| b_pk | 51 | 51 |

As also shown in diagram T15 of FIG. 6, entity A is updated by setting its link to entity B to null; of course, the previously linked instance of entity B still exists.

EXAMPLE 9

Edit of Back-Linked Sub-Entity

This example differs from Example 7 in that entity B is back-linked to entity A. It is noted that back-links are in general not recommended since they alter the results cardinality. However, they are allowed and meant to be used in the case of one-to-one relationships.

The partial entities processing order is: first entity A then entity B, which is a reverse order with respect to Examples 7 and 8.

Sample Case 9.1: Creation

New values are specified for a1, a2, a3, b1 and b2. Previous values are all null, and both unique keys are null as well.

TABLE 16

| Property alias | Previous value | New Value |
|---|---|---|
| a1 | | a_val1 |
| a2 | | a_val2 |
| a3 | | a_val3 |
| a_pk | | |
| b1 | | b_val1 |
| b2 | | b_val1 |
| b_pk | | |

A new instance of entity A is created, then a new instance of entity B that refers to it is created as also shown in virtual entity diagram T18 of FIG. 6.

Sample Case 9.2: Editing Both Partial Entities

In this sample case, new values are given to a1, a2, a3, b1 and b2.

TABLE 17

| Property alias | Previous value | New Value |
|---|---|---|
| a1 | a_val1 | a_new_val1 |
| a2 | a_val2 | a_new_val2 |
| a3 | a_val3 | a_new_val3 |
| a_pk | 7 | 7 |
| b1 | b_id1 | b_new_val1 |
| b2 | b_val2 | b_new_val2 |
| b_pk | 51 | 51 |

Both entities A and B are updated as also shown in virtual entity diagram T19 of FIG. 6.

Sample Case 9.3: Deleting the Sub-Entity

In this sample case, null values are given to b1 and b2 which are all the "accessible" values for B.

TABLE 17

| Property alias | Previous value | New Value |
|---|---|---|
| a1 | a_val1 | a_val1 |
| a2 | a_val2 | a_val2 |
| a3 | a_val3 | a_val3 |
| a_pk | 7 | 7 |
| b1 | b_val1 | <null> |
| b2 | b_val2 | <null> |
| b_pk | 51 | 51 |

This instance of B, i.e. the one having b_pk=51, is removed from the database as also shown in virtual entity diagram T20 of FIG. 6.

EXAMPLE 10

Editing Pivot-Linked Sub-Entity

Figure 7:
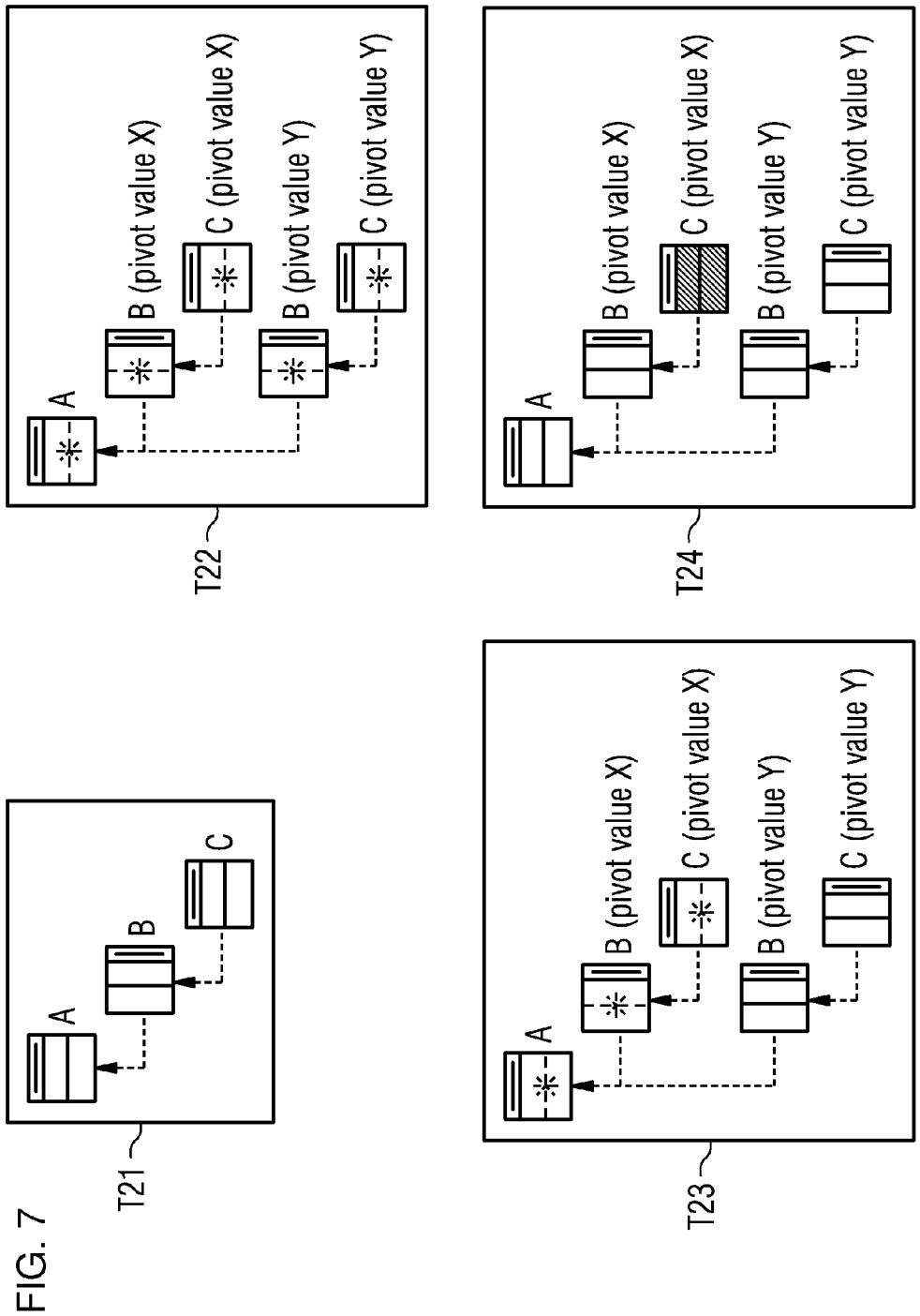
FIG. 7 is an illustration of diagrams schematically illustrating different examples of virtual entities defined as hierarchical structures of real entities according to example embodiments of the proposed invention.

In this example, the main entity A has a pivot-linked sub-entity B with a back-linked sub-entity C as shown in virtual entity diagram T21 of FIG. 7. Properties a1, a2, a3 and a_pk are taken from entity A, property $b_1$ and b_pk from entity B, property c1, c2 and c_pk from entity C. Pivot values for sub-entity B are X and Y.

The partial entities processing order is: first main entity A, then sub-entity B, then sub-entity C.

Sample Case 10.1: Creation

In this sample case, new values are specified in for a1, a2, a3, Xb1, Xc1, Xc2, Yb1, Yc1 and Yc2. Previous values in are all null, and all unique keys are null as well.

TABLE 18

| Property alias | Property value | New value |
|---|---|---|
| a1 | | a_val1 |
| a2 | | a_val2 |
| a3 | | a_val3 |
| a_pk | | |
| Xb1 | | xb_val1 |
| Xb_pk | | |
| Xc1 | | xc_val1 |
| Xc2 | | xc_val2 |
| Xc_pk | | |
| Yb1 | | yb_val1 |
| Yb_pk | | |
| Yc1 | | yc_val1 |
| Yc2 | | yc_val2 |
| Yc_pk | | |

New instances for partial entities A, B and C are created as follows: a new instance of A first, then two new instances of B referring to it (one for pivot value X and one for pivot value Y) and finally two new instances of C, each referring to its "father" B instance as shown in virtual entity diagram T22 of FIG. 7.

Sample Case 10.2: Partial Creation

In this sample case, new values are specified for a1, a2, a3, Xb1, Xc1, and Xc2. Previous values are all null, and all unique keys are null as well.

TABLE 19

| Property alias | Property value | New value |
|---|---|---|
| a1 | | a_val1 |
| a2 | | a_val2 |
| a3 | | a_val3 |
| a_pk | | |
| Xb1 | | xb_val1 |
| Xb_pk | | |
| Xc1 | | xc_val1 |
| Xc2 | | xc_val2 |
| Xc_pk | | |
| Yb1 | | |
| Yb_pk | | |
| Yc1 | | |
| Yc2 | | |
| Yc_pk | | |

New instances are created as follows: a new instance of entity A first, then a new instance of entity B that refers to it (for pivot value X) and finally a new instance of entity C referring to its "father" entity B instance, as also shown in virtual entity diagram T23 of FIG. 7.

Sample Case 10.3: Partial Editing

In this sample case, new values are given to properties Xc1 and Xc2.

TABLE 20

| Property alias | Property value | New value |
|---|---|---|
| a1 | a_val1 | a_val1 |
| a2 | a_val2 | a_val2 |
| a3 | a_val3 | a_val3 |
| a_pk | 32 | 32 |
| Xb1 | xb_val1 | xb_val1 |
| Xb_pk | 136 | 136 |
| Xc1 | xc_val1 | xc_new_val1 |
| Xc2 | xc_val2 | xc_new_val2 |
| Xc_pk | 2112 | 2112 |
| Yb1 | xc_val1 | xc_val1 |
| Yb_pk | 71 | 71 |
| Yc1 | yc_val1 | yc_val1 |
| Yc2 | yc_val2 | yc_val2 |
| Yc_pk | 9 | 9 |

Only the instance of entity C corresponding to pivot value X needs to be updated, as also shown in virtual entity diagram T24 of FIG. 7.

Delete Method

In addition to the main root entity, only back-linked and pivot-linked partial entities are affected by the aggregate Delete method.

Again, partial entities are processed in an order derived from data dependencies, which is reversed with respect to the Edit method case:

if child entity C is linked to father entity F with a back or pivoted link, child entity C is processed before father entity F; and if child entity C is linked to father entity F with a straight link, child entity C and its sub-entities are not affected by Delete.

EXAMPLE 11

Deleting Straight-Linked Cascaded Entities

Deleting a virtual entity consisting of cascades straight-linked entities, as shown in virtual entity diagram T25 of FIG. 8, means to delete the root entity instance only, entity A in this example, as shown in virtual entity diagram T26 of FIG. 8.

EXAMPLE 12

Deleting a Back-Linked Entity

Back-linked entities are deleted before their referred entity. For instance, for the virtual entity in the example shown in virtual entity diagram T27 of FIG. 8, entity B is deleted first, then entity A as shown in virtual entity diagram T28 of FIG. 8.

Plugins

In embodiments of the present invention, one or more operation plugins may be defined for customizing the behavior of data access methods. A plugin is an external software module implementing a custom action. A plugin may be defined for on or more entities or virtual entities associated to on one or more of the entity methods.

Figure 9:
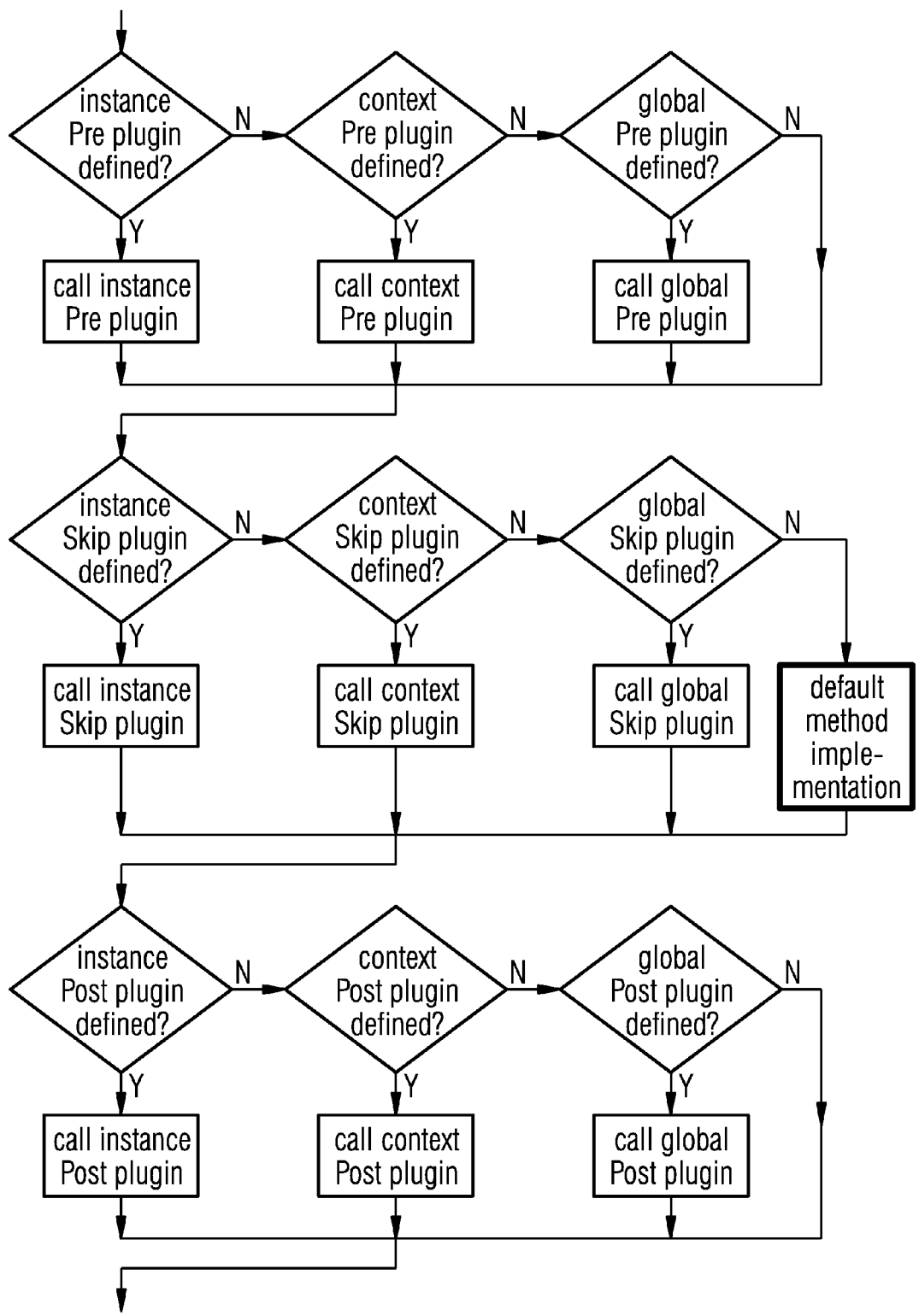
FIG. 9 is a flowchart schematically illustrating an example of plug-in execution for an entity operation according to an example embodiment of the proposed invention.

FIG. 9 is a flowchart schematically illustrating an example of plugin execution for an entity operation according to an example embodiment of the proposed invention.

Plugins may be assigned to entity operations according to three ways. According to a first way, a global plugin is assigned to the execution of a specific operation on all the instances of a given entity. According to a second way, a context plugin is assigned to the execution of an operation on all the entity instances whose context, i.e. a particular property exposed by all entities, matches a given value.

According to a third way, an instance plugin is assigned to the execution of an operation on a specific instance.

As shown in the flow chart of FIG. 9, instance plugins override context plugins which in turn override global plugins.

Moreover, in invention embodiments, with respect to the default operation, plugins with different role types may be defined. According to a first role type, a "pre" plugin may be defined which is a plugin executed before the default operation.

According to a second role type, a "skip" plugin may be defined which is a plugin executed instead the default operation. According to a third role type, a "post" plugin may be defined which is a plugin executed after the default operation.

Pre, skip and post plugins may be configured in a completely independent way, i.e. they are not mutually exclusive as also shown in the flow chart of FIG. 9.

In invention embodiments, data exchanged between the framework and external plugins may conveniently include a flow-control parameter, which can be set by plugins to affect the execution flow.

Advantageously with the possibility of defining plugins, any operation on data can be customized to the need of a specific solution in an easy and flexible manner.

EXAMPLE 13

A "Skip" Plugin

In this example, let us assume that a global "skip" plugin called "CustomEntryCreation" is defined for the Entry.Create( )ethod. With such a plugin, every explicit or implicit, i.e.

aggregate write, invocation of the Create( ) method on any instance of the entity Entry eventually resolves to a call to the CustomEntryCreation plugin so that the default implementation is ignored.

EXAMPLE 14

A "Post" Plugin

In this example, let us assume that a context "post" plugin called "EntryCreationTrack" is associated to the Entry.Create( )ethod for instances which have a given value of their "context" property. For example, the context property could identify, for example, entities created by a specific user or by a particular application page. Such "EntryCreationTrack" plugin is then called every time an entry has been created in the specified context. Its purpose could be the tracking of operation time, instance data and outcome.

EXAMPLE 15

A "Pre" Plugin

In this example, let us assume that a global "pre" plugin called "EntryValidation" is defined for the Entry.Create( )method. Its purpose is to check the validity of the Entry before it is actually written to the database. If data are not valid, the EntryValidation plugin may be enabled to interrupt the operation and report a warning.

Generation of Dynamic Entities

Entities at the DAL level may be standard or custom. Standard entities are also called product or base entities and are library entities with generic validity. For example, in the MES field, a set of standard MES entities organized in components may be exposed to deal with the most common business objects.

In general, the standard entities cover only part of a specific system data model.

Often it is required that other information, usually stored in custom database tables, is integrated in the data level.

Advantageously, in invention embodiments, the possibility of defining custom entities generated for a specific custom application, here in called dynamic entities, is provided.

Conveniently, such dynamic entity generation functionality allows the creation of custom business objects having the same interface of standard entities.

A first advantage is that the "external" interface is the same, i.e. dynamically generated entities can be used by developers and by other software modules and tools as standard entities.

A second advantage is that also the "internal" interface is the same, i.e. dynamically generated entities can be used in virtual entity descriptors as above mentioned in Example 6.

Dynamic entity generation is obtained by defining a dynamic entity descriptor, an object holding information about the entities to generate.

Figure 10:
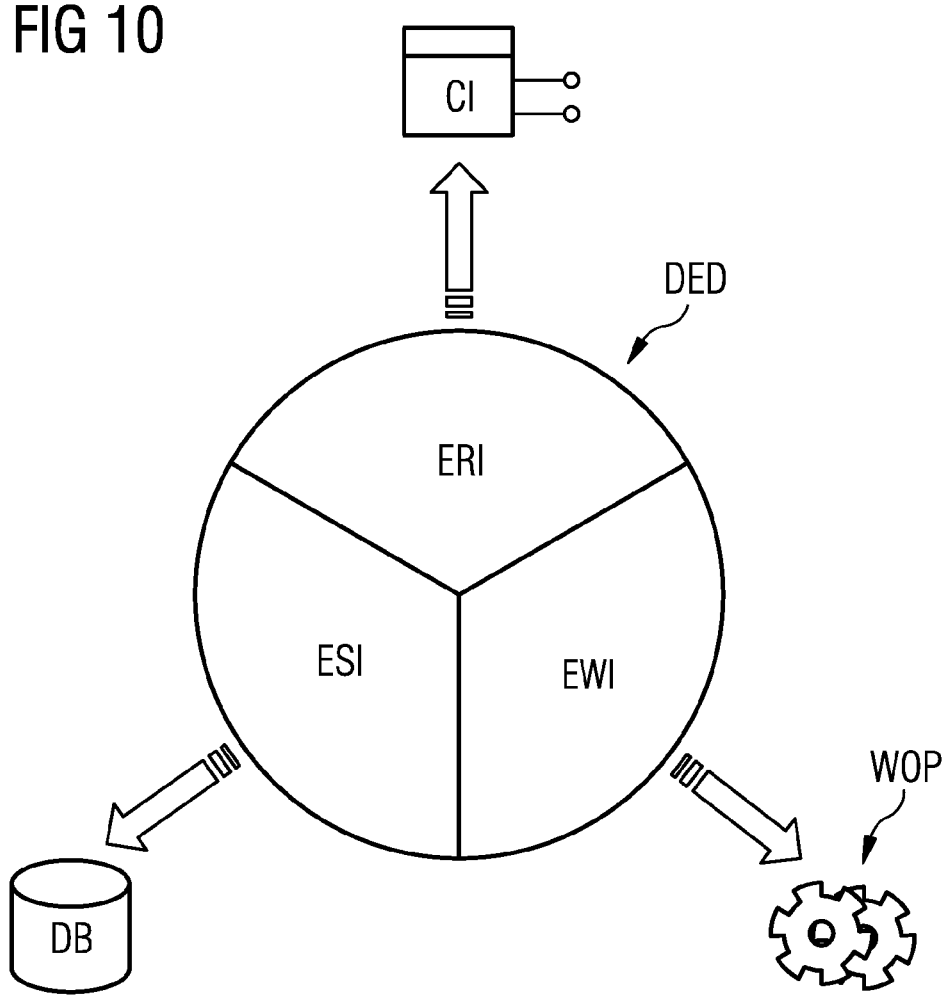
FIG. 10 is a diagram schematically illustrating the type of information contained in a dynamic entity descriptor structure according to an example embodiment of the present invention.

FIG. 10 is a diagram schematically illustrating the type of information contained in a structure of the dynamic entity descriptor DED according to an example embodiment of the present invention.

The information held by the dynamic entity descriptor DED is the following:

information ERI on how entities are represented in the Data Access Layer, e.g. class names, property names and types, specific attribute CI;

information ESI on how entity data are stored in the repository DB, e.g. database tables, views, fields/expressions. Such information is used to automatically implement all the methods constituting the internal interface needed by the framework to perform read operations; and information EWI on how entities are to be written, i.e. which external providers WOP are called to perform write operations. Write providers may be chosen from general purpose providers available in the framework, e.g. a simple provider performing INSERTs, UPDATEs and DELETEs on database tables, as well as custom providers developed ad hoc for specific entities.

In addition to the embodiments of the present invention described above, the skilled persons in the art will be able to arrive at a variety of other arrangements and steps which, if not explicitly described in this document, nevertheless fall within the scope of the appended claims.

The invention claimed is:

1. A method for accessing entities of a data access layer, the data access layer following an entity-relationship model in which data are depicted in term of the entities and relationships between them, the entities being provided with a CRUD (Create, Read, Update, Delete) interface, which comprises the steps of:
    defining a meta-entity, hereinafter referred to as a virtual entity, resulting as a composition of parts of at least one entity;
    describing the virtual entity, via a virtual entity descriptor, as a hierarchical structure in which the entities are connected in a parent-child structure via a link, and in the virtual entity descriptor, specifying which properties are taken from each entity to form partial entities of the virtual entity;
    providing CRUD (Create, Read, Update, Delete) methods for accessing the entities composing the virtual entity, wherein the CRUD methods include a read method and at least one write method;
    providing a CRUD (Create, Read, Update, Delete) interface on the virtual entity; and
    at run time, accessing the virtual entity via the CRUD interface by calling the write method of the CRUD methods to write to the entities composing the virtual entity;
    wherein the write method is an edit method in which:
    a check is performed on the hierarchical structure of the virtual entity in order to decide a processing order of each of its partial entities:
    if the child entity is linked to a father entity with a straight link, the child entity is processed before the father entity;
    if the child entity is linked to the to the father entity with a back link, the child entity is processed after the father entity;
    wherein a processing of each partial entity contains the following sub-steps:
        the partial entity is examined to check whether it is to be modified or not;
    if it is to be modified:
        an up-to-date full entity instance is retrieved from a database;
        a check is performed on a hierarchical position of a current partial entity:
            if the current partial entity is a root entity or is straight-linked to its father, it is retrieved either through one of its lookup identifiers if marked as looked-up or through one of its unique keys;
            if it is successfully retrieved, it is updated with new values on the database, unless it is a lookup entity which is not marked as "updatable";
    otherwise,
    if the current partial entity is back-linked to its father: if the current partial entity is not retrievable through a unique key, an entity instance with the new values is created; otherwise if all the new values of its accessible properties are null, a full entity instance is removed from the database, otherwise, if at least one new value of an accessible property is not null, the current partial entity is updated with the new values.

2. The method according to claim 1, wherein links connecting parent and child entities are selected from the group consisting of straight links wherein a parent entity includes a set of property referencing a child entity, back-links wherein the child entity includes a set of property referencing the parent entity, and pivot back-links wherein a set of child-entity properties is replicated once for every desired value of a given pivot identifier.

3. The method according to claim 2, wherein at least one child entity is an optional sub-entity implying that a relationship between the parent entity and the child entity itself is not mandatory.

4. The method according to claim 2, wherein at least one straight-linked child entity is a look-up sub-entity implying that at least one set of properties is marked as identifier uniquely identifying sub-entity instances and the lookup sub-entity is used for locating specific instances on a basis of its set of identifiers and for reading its properties from a repository so that link properties referencing the set can be updated in the parent entity.

5. The method according to claim 1, which further comprises storing information on the entities in a repository.

6. The method according to claim 5, which further comprises selecting the repository from the group consisting of a database and a relational database.

7. The method according to claim 1, which further comprises implementing the read method on the virtual entity as a call of read methods on the entities composing the virtual entity.

8. The method according to claim 1, wherein a collection of virtual entity instances are implemented as a selection of a group consisting of at least one of the following:
".NET" standard objects;
DataSet and/or DataTable objects bounded to an ObjectDataSource; and
other standard representations suitable to provide data to third-party ASP.NET controls.

9. The method according to claim 1, wherein the CRUD methods include another write method that is a delete method in which:
if the child entity is linked to the father entity with a back link, the child entity is deleted before and the father entity is deleted afterwards; otherwise,
if child entity is linked to father entity with a straight link, only the father entity is deleted.

10. The method according to claim 1, wherein for at least one of the methods of the CRUD interface of at least one entity, at least a plugin to be executed at run time is associated, wherein the plugin is an external software module implementing a custom action.

11. The method according to claim 10, wherein the at least one entity is a virtual entity.

12. The method according to claim 1, wherein the entities are custom entities, generated in a dynamic way with information contained in a dynamic entity descriptor structure, the dynamic entity descriptor structure contains the following information:
information on how the entities are represented in the data access layer;
information on how entity data are stored in a repository; and
information on how the entities are to be written and which external providers are called to perform write operations.

13. A system, comprising:
a computing device for accessing entities of a data access layer, the data access layer following an entity-relationship model in which data are depicted in terms of the entities and relationships between them, the entities being provided with a CRUD (Create, Read, Update, Delete) interface; and
a non-transitory computer usable medium having computer readable program code stored thereon for causing said computing device to:
define a meta-entity, hereinafter referred as a virtual entity, resulting as a composition of parts of at least one entity;
describe the virtual entity, via a virtual entity descriptor, as a hierarchical structure in which the entities are connected in a parent-child structure via a link, and in the virtual entity descriptor, specifying which properties are taken from each entity to form partial entities of the virtual entity;
provide CRUD (Create, Read, Update, Delete) methods for accessing the entities composing the virtual entity, wherein the CRUD methods include a read method and at least one write method;
provide a CRUD (Create, Read, Update, Delete) interface on the virtual entity; and
at run time, accessing the virtual entity via the CRUD interface by calling the write method of the CRUD methods to write to the entities composing the virtual entity;
wherein the write method is an edit method in which:
a check is performed on the hierarchical structure of the virtual entity in order to decide a processing order of each of its partial entities:
if the child entity is linked to a father entity with a straight link, the child entity is processed before the father entity;
if the child entity is linked to the to the father entity with a back link, the child entity is processed after the father entity;
wherein a processing of each partial entity contains the following sub-steps:
the partial entity is examined to check whether it is to be modified or not;
if it is to be modified:
an up-to-date full entity instance is retrieved from a database:
a check is performed on a hierarchical position of a current partial entity:
if the current partial entity is a root entity or is straight-linked to its father, it is retrieved either through one of its lookup identifiers if marked as looked-up or through one of its unique keys;
if it is successfully retrieved, it is updated with new values on the database, unless it is a lookup entity which is not marked as "updatable";
otherwise,
if the current partial entity is back-linked to its father: if the current partial entity is not retrievable through a unique key, an entity instance with the new values is created; otherwise if all the new values of its accessible properties are null, a full entity instance is removed from the database, otherwise, if at least one new value of an accessible property is not null, the current partial entity is updated with the new values.

14. A non-transitory computer usable medium having computer executable instructions stored thereon for performing a method for accessing entities of a data access layer, the data access layer following an entity-relationship model in which data are depicted in terms of the entities and relationships between them, the entities being provided with a CRUD (Create, Read, Update, Delete) interface, the method comprises the steps of:
- defining a meta-entity, hereinafter referred as a virtual entity, resulting as a composition of parts of at least one entity;
- describing the virtual entity, via a virtual entity descriptor, as a hierarchical structure in which the entities are connected in a parent-child structure via a link, and in the virtual entity descriptor, specifying which properties are taken from each entity to form partial entities of the virtual entity;
- providing CRUD (Create, Read, Update, Delete) methods for accessing the entities composing the virtual entity, wherein the CRUD methods include a read method and at least one write method;
- providing a CRUD (Create, Read, Update, Delete) interface on the virtual entity; and
- at run time, accessing the virtual entity via the CRUD interface by calling the write method of the CRUD methods to write to the entities composing the virtual entity;

wherein the write method is an edit method in which:
- a check is performed on the hierarchical structure of the virtual entity in order to decide a processing order of each of its partial entities:
- if the child entity is linked to a father entity with a straight link, the child entity is processed before the father entity;
- if the child entity is linked to the to the father entity with a back link, the child entity is processed after the father entity;

wherein a processing of each partial entity contains the following sub-steps:
- the partial entity is examined to check whether it is to be modified or not;
- if it is to be modified:
- an up-to-date full entity instance is retrieved from a database:
- a check is performed on a hierarchical position of a current partial entity:
- if the current partial entity is a root entity or is straight-linked to its father, it is retrieved either through one of its lookup identifiers if marked as looked-up or through one of its unique keys;
- if it is successfully retrieved, it is updated with new values on the database, unless it is a lookup entity which is not marked as "updatable";

otherwise,
if the current partial entity is back-linked to its father: if the current partial entity is not retrievable through a unique key, an entity instance with the new values is created; otherwise if all the new values of its accessible properties are null, a full entity instance is removed from the database, otherwise, if at least one new value of an accessible property is not null, the current partial entity is updated with the new values.

* * * * *